No. 659,625. Patented Oct. 9, 1900.
G. A. NORCROSS & R. A. HOLLOWAY.
CHURNING DEVICE.
(Application filed Nov. 27, 1899.)
(No Model.) 2 Sheets—Sheet 1.
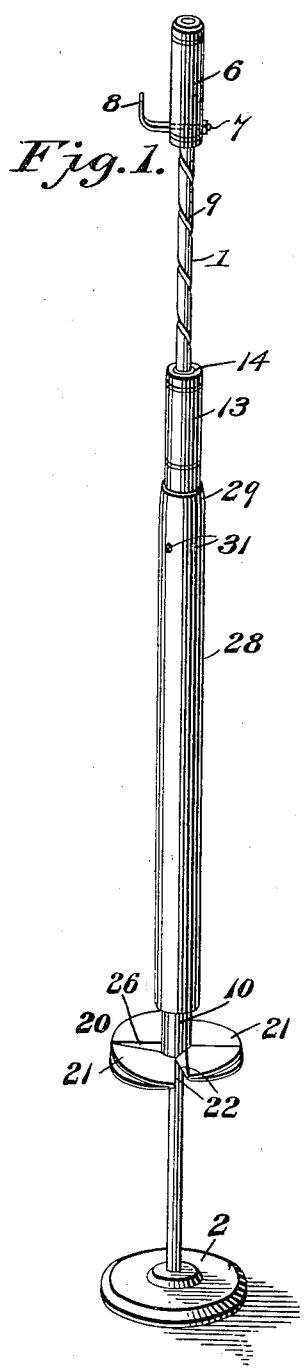
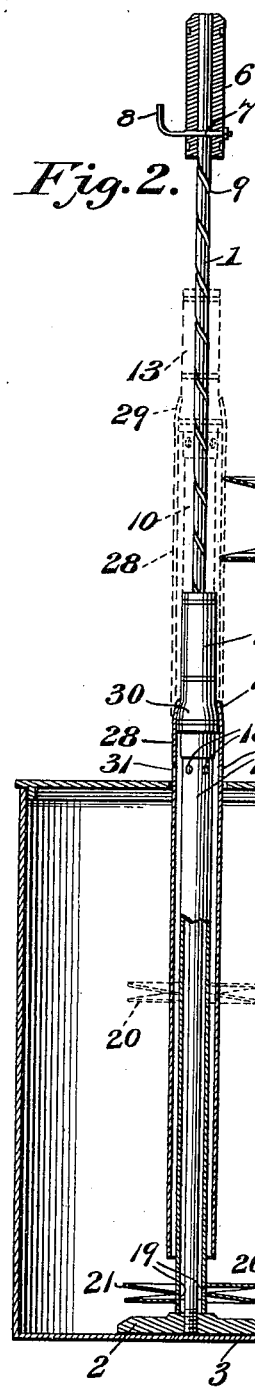
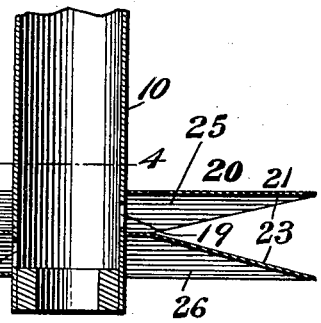
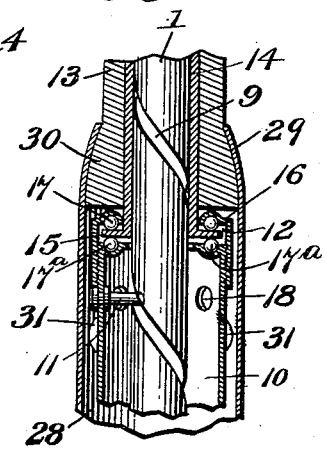
Witnesses
Edwin G. McKee
George A. Norcross and
Robert A. Holloway
Inventors
By — Attorney

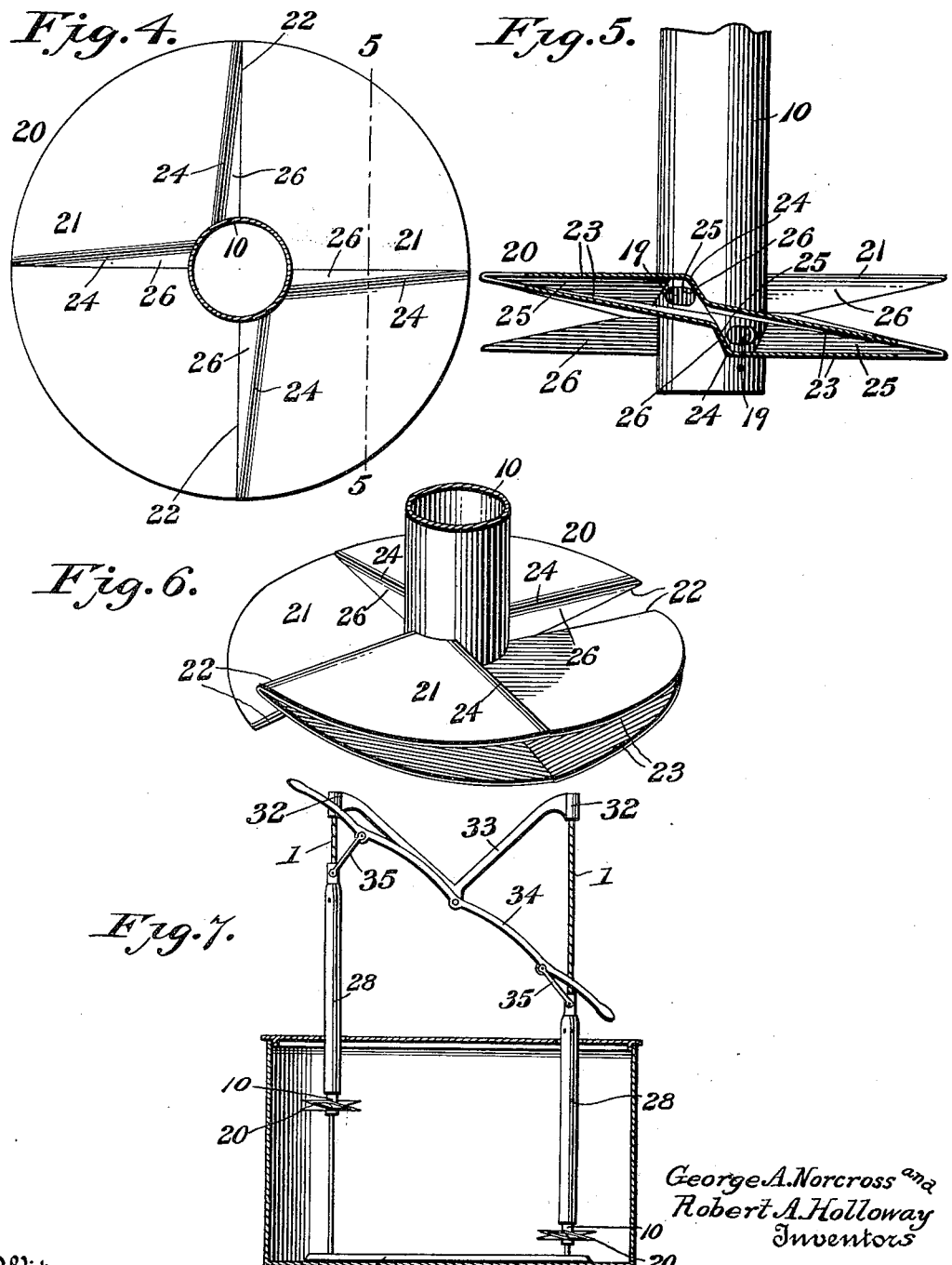

UNITED STATES PATENT OFFICE.

GEORGE A. NORCROSS AND ROBERT A. HOLLOWAY, OF HENDERSON, KENTUCKY.

CHURNING DEVICE.

SPECIFICATION forming part of Letters Patent No. 659,625, dated October 9, 1900.

Application filed November 27, 1899. Serial No. 738,416. (No model.)

*To all whom it may concern:*

Be it known that we, GEORGE A. NORCROSS and ROBERT A. HOLLOWAY, citizens of the United States, residing at Henderson, in the county of Henderson and State of Kentucky, have invented a new and useful Churning Device, of which the following is a specification.

This invention relates to churns, and more especially to churning devices of the type which are capable of general use in connection with an ordinary churn-receptacle or vessel.

To this end the invention contemplates an improved churning device adapted for use in connection with any ordinary form of churn receptacle or vessel without requiring any attaching devices or braces for holding the same in operative position and provided with simple and efficient means for forcibly distributing currents of air throughout the entire body of liquid, while at the same time subjecting the latter to agitation to insure a thorough churning action.

A further object of the invention is to provide novel means for holding the entire churning device in an upright operative position within the churn-receptacle without auxiliary fastenings or braces, thereby permitting of the ready insertion of the device into the churn-receptacle for immediate use as well as the ready removal thereof from the receptacle when the churning action is completed.

Another object of the invention is to provide the device with a novel form of dasher so constructed and operated as not to tend to displace or bodily move the liquid in the path thereof, and thereby be greatly resisted in its action, while at the same time providing for maintaining the liquid in a state of agitation and forcibly distributing air-currents throughout the entire body thereof to cause a rapid release of the butter globules in the manner common to the action of that type of churning apparatus commonly known in the art as "air-churns."

With these and many other objects in view, which will more readily appear as the nature of the invention is better understood, the same consists in the novel construction, combination, and arrangement of parts hereinafter more fully described, illustrated, and claimed.

The fundamental features of the invention, which are essential to the successful carrying out of the same, are necessarily susceptible to various modifications without departing from the spirit or scope of the invention; but the preferred embodiments of the improvements are shown in the accompanying drawings, in which—

Figure 1 is a perspective view of a complete churning device constructed in accordance with the present invention. Fig. 2 is a longitudinal sectional view of the device, showing the same within a churn-receptacle, the full and dotted line positions indicating the vertical play of the dasher from the top to the bottom of the column of liquid. Fig. 3 is an enlarged sectional view of a portion of the air-conducting tube or stem carrying the revoluble air-distributing dasher. Fig. 4 is a cross-sectional view on the line 4 4 of Fig. 3 above the plane of the dasher, illustrating the latter in plan. Fig. 5 is a cross-sectional view on the line 5 5 of Fig. 4. Fig. 6 is an enlarged detail in perspective of the dasher. Fig. 7 is a detail elevation showing a double or duplex form of churning device adapted for use in a large-sized churning-receptacle. Fig. 8 is an enlarged detail sectional view of the swivel-joint connection for the air-conducting tube.

Like numerals of reference designate corresponding parts in the several figures of the drawings.

In carrying out the invention there is employed a single upright supporting-standard 1, which is of a suitable length to extend the full height of the ordinary sizes of churn-receptacles and a sufficient distance above the same to accommodate the movement of the working parts of the device. The said supporting-standard may consist of a single rod or bar and is positively sustained in its upright operative position by means of a weight-base 2. The lower end of the standard 1 is screwed or otherwise suitably fitted to the base 2, and the latter may be of any suitable size or shape, according to the sizes and shapes of the churn-receptacles in connection with which the device may be used. The essential feature of this part of the churning device is that the base 2 be constructed of a sufficient weight, so as to hold the standard 1 perfectly steady in its upright operative position, thereby requiring no supplemental fastenings or braces to hold the churning device in position within the churn-receptacle, any tendency of the supporting-standard 1 to tilt or move to an inoperative position being counteracted by the weight of the base 2, said base being preferably provided with a flat bottom 3, whereby the same may rest flat upon the bottom of the churn - receptacle within which it may be placed. The position of the device within the churn-receptacle is shown in Fig. 2 of the drawings, said churn-receptacle being designated by the numeral 4 and illustrated as being of an ordinary form, provided with any suitable cover 5, through which the upwardly-projecting parts of the device may extend to permit of carrying out the churning operation.

While the weight-base 2 is constructed sufficiently heavy to provide for sustaining the supporting-standard 1 in its upright operative position, the said standard is preferably steadied when in use by means of a hand-grip 6, detachably fitted to the extreme upper end of the said standard 1. A convenient way of detachably holding the hand-grip 6 upon the upper end of the standard 1 is the employment of a fastening-bolt 7, extending transversely through alined openings in the grip 6 and the upper end portion of the standard 1 and provided at one extremity with a flattened upturned rest-hook 8, which receives the lower edge of the hand grasping the grip 6 to provide an easy rest therefor to prevent the hand from slipping, and thereby obviating the necessity of tightly gripping the said grip 6, inasmuch as it is only necessary to take hold of the latter to provide for holding the standard 1 steady during the movement of the operating parts of the device. It will of course be understood that other equivalent expedients may be resorted to for detachably fastening the grip 6 to the standard; but it is essential in connection with this part of the invention to have projected laterally from the grip 6 the rest-hook 8.

The single upright supporting-standard 1 is provided for a portion of its length with a spiral groove 9 and accommodates for movement thereover a vertically-reciprocating rotatable air-conducting tube 10. The air-conducting tube 10 is materially shorter in length than the distance between the hand-grip at the upper end of the standard 1 and the weight-base 2 at the lower end thereof to permit of a reciprocating movement equal in length to the depth of the body of liquid within the churn-receptacle in order that air may be distributed, in the manner hereinafter described, throughout all portions of the body of liquid during the churning operation. The said air-conducting tube 10 loosely fits over the standard 1 and is provided at a suitable point therein, preferably at its upper end, with a rigid inwardly-projecting slide-lug 11, which loosely and slidably engages in the spiral groove 9 of the standard 1 and is designed to travel from end to end of this groove to provide means, in combination therewith, for imparting a positive rotation to the tube 10 alternately in reverse directions as the same is reciprocated or moved up and down. To provide for the reciprocation of the air-conducting tube 10, the same has connected to the upper end thereof, by means of a swivel-joint 12, a non-rotating reciprocatory operating-handle 13. The operating-handle 13 extends above the upper end of the tube 10 and is provided with an interior thimble or core 14, provided with a flanged lower end 15, loosely projecting into the upper end of the tube 10 and underlapping the inwardly-projecting flange 16 on said tube 10 to permit of the interposition between said flanges 15 and 10 of a plurality of antifriction bearing-balls 17, thereby providing the preferable form of the swivel-joint 12, which loosely couples the operating-handle with the upper end of the air-conducting tube 10. A plurality of antifriction-balls 17$^a$ are also arranged beneath the flange 15 to insure free movement.

The air-conducting tube 10 is provided contiguous to the upper end thereof with a plurality of air-inlet ports 18, which are always exposed to the outer air above the churn-receptacle, so that a fresh supply of air will always enter the tube during the churning operation, and at or contiguous to its lower end the said tube is further provided in the wall thereof with a plurality of spaced air-inlet ports 19, which communicate with the interior of the hollow-blade portions of the air-distributing dasher 20 in the manner to be presently explained.

The air-distributing dasher 20 is made fast upon the lower end of the air-conducting tube 10 by means of any suitable mechanical expedient, so as to move in unison with said tube, both in its reciprocatory and rotary movements, and in carrying out the invention the said dasher 20 is constructed in the form of a split screw-disk consisting of a pair of duplicate oppositely-located hollow blades 21, disposed obliquely or at an inclination to a horizontal plane and reversely inclined with relation to the dasher to provide a screw or turbine-like construction. The inner contiguous straight edges 22 of the hollow blades 21 are necessarily separated by reason of the reverse inclination of the opposite blades, thereby permitting of the dasher having a screw action in the liquid as it is reciprocated therein. Each of the oblique or inclined hollow blades 21 of the dasher 20 is practically of a semicircular shape, so that the two blades will make a complete circular disk, and each of said hollow blades 21 essentially consists of upper and lower walls 23, spaced apart to leave an intervening open air space or chamber and unconnected at their outer edges to permit of the free discharge of air into the liquid. The said upper and lower spaced walls 23 of each blade 21 of the dasher are preferably provided at an intermediate point with a transverse deflected portion 24, producing an interior impact-shoulder 25 and an exterior agitating-shoulder 26. At each side of the interior transverse impact-shoulders 25 of each dasher-blade 21 there is located one of the air-outlet ports 19 of the air-conducting tube 10, so that air may be delivered into each dasher-blade at each side of the interior impact-shoulders thereof, and at this point it is to be observed that the upper and lower impact-shoulders 25 of each dasher-blade are disposed reversely with relation to each other, so that one shoulder will be operative when the dasher rotates in one direction, and vice versa. It will also be noted at this point that each dasher-blade 21 is of an outwardly-flaring form, which necessarily facilitates the free discharge of air into the liquid within the churn-receptacle.

In the action of the device it will be understood that the grip 6 is engaged by one hand and the operating-handle 13 by the other hand and that by reciprocating this handle the engagement of the slide-lug 11 with the spiral groove 9 of the stationary standard 1 causes a rotation of the air-conducting tube 10 and a consequent rotation of the air-distributing dasher 20. As already explained, the length of the standard 1 is sufficient to permit of the dasher being reciprocated vertically through the body of liquid in the churn-receptacle from the top to the bottom thereof, while at the same time being rapidly rotated horizontally and alternately in reverse directions as the same moves up and down. In connection with this operation an essential feature of the invention resides in the fact that the dasher is constructed in the form of a split screw-disk and is given a positive rotation by mechanical means, so that the said dasher will screw its way through the liquid both in the upward and downward thrusts thereof, thereby overcoming the resistance that would otherwise be afforded to its vertical movement through the body of liquid. In this particular the action of the dasher is distinctively different from that type of revolving screw-dashers which are caused to rotate by the impact thereof against the body of liquid as the same is forced therethrough. In the present invention the rapid mechanical rotation of the dasher entirely obviates this impact action and causes the blades of the dasher to spirally cut through the body of liquid. This necessarily permits of an exceedingly rapid manipulation of the device, inasmuch as the liquid affords a minimum amount of resistance to the vertical thrust thereof, and as the dasher rotates at a rapid speed a partial vacuum is created within the air spaces or chambers of the hollow blades 21, thereby causing the air to rush through the tube 10 into the said blades and thence horizontally throughout the body of the liquid. This forcible discharge of air throughout the entire body of liquid necessarily causes a rapid release of the butter globules, with a consequent rapid production of butter.

The releasing and breaking up of the butter globules are greatly facilitated in the operation of churning by the violent agitation of the liquid, which is necessarily induced by the dasher 20. The exterior shoulders 26 of the dasher-blades necessarily exert an agitating action, and on account of the screw shape of the dasher and the rapid reciprocation thereof the liquid will be caused to surge after the dasher on both the up and down strokes thereof, all of which materially contributes to a rapid and thorough churning operation.

It is preferable in carrying out the invention to provide the device with means for preventing the splashing out of the milk from the churn-receptacle through the cover-opening. We accomplish this by the employment of a splash-guard 28 in the form of a sleeve, provided at its upper end with a contracted neck 29, adapted to engage with and fit on a swelled portion 30 of the operating-handle 13. This provides means for suspending the splashing-sleeve 28 from its upper end, so that it will hang over the air-conducting tube for the greater portion of its length, and thereby prevent the dasher from splashing the liquid outside of the churn-receptacle. The splash-sleeve 28 is provided with air-ports 31, which permit of air freely entering into the air-inlet ports 18 of the air-conducting tube 10. The said splash-sleeve 28 may be readily removed by slipping the same upwardly and off the operating-handle 13, and by removing the detachable hand-grip 6 from the upper end of the standard 1 the entire device may be slipped off of the standard for purposes of cleaning or repair, as will be readily understood.

In carrying out the invention it is necessary in churning with large churn-receptacles to use two or even more of the devices, and to illustrate how a plurality of the herein-described devices may be employed in a large churn-receptacle there is shown in Fig. 7 of the drawings a pair of the devices having their standards 1 fitted to a common weight-base 2ª of a sufficient size and weight to provide for properly holding both devices within the receptacle without extra fastenings or braces. In the modification illustrated the standards 1 have fitted to their upper ends the caps 32 at opposite ends of the lever-bracket 33, arranged between the two standards and pivotally supporting thereon a walking-lever 34, having suitable link connections 35 with the upper ends of the air-conducting tubes 10. By oscillating the lever 34 the opposite air-conducting tubes and dashers are given an alternate reciprocation within the churn-receptacle.

It will of course be understood that any number of the devices may be associated in a suitable manner without departing from the invention. It may also be observed at this point that while the necessary vacuum may be produced within the hollow blades of the dasher to insure the circulation of air into the same and out through the body of liquid without recourse to the interior impact-shoulders, still these shoulders materially contribute to forcing the air outward from the blades into the body of liquid, inasmuch as said shoulders are disposed directly at one side of the plane of the ports through which the air is discharged from the air-conducting tube 10. It will also be understood that various changes in the form, proportion, and minor details of construction may be resorted to without departing from the principle or sacrificing any of the advantages of this invention.

Having thus described the invention, what is claimed as new, and desired to be secured by Letters Patent, is—

1. A churning device comprising a revoluble dasher in the form of a screw-disk, air-supplying means, and mechanical means for imparting a positive rotation to the dasher and simultaneously reciprocating the same in a vertical direction, said dasher having an unobstructed vertical clearance therethrough at both the upper and lower sides of the same to permit of its passage through the liquid without displacement thereof, substantially as set forth.

2. A churning device comprising a revolving dasher in the form of a screw-disk and having hollow air-distributing blades in communication with the outer air, and mechanical means for imparting a positive rotation to the dasher and simultaneously reciprocating the same in a vertical direction, substantially as set forth.

3. A churning device comprising a revolving dasher in the form of a split screw-disk having a pair of duplicate hollow air-distributing blades in communication with the outer air, and mechanical means for imparting a positive rotation to the dasher and simultaneously reciprocating the same in a vertical direction, substantially as set forth.

4. A churning device comprising a revolving dasher in the form of a split screw-disk having a pair of duplicate hollow air-distributing blades in communication with the outer air, and mechanical means for imparting a positive rotation to the dasher alternately in reverse directions, and simultaneously reciprocating the same in a vertical direction, substantially as set forth.

5. A churning device comprising a revolving dasher consisting of a split screw-disk having a pair of duplicate oppositely-located hollow blades, disposed obliquely and in reverse relation to each other, each of said blades having at their inner sides air-inlet ports in communication with the outer air and open at their peripheries, and mechanical means for imparting a positive rotation to the dasher alternately in reverse directions, and simultaneously reciprocating the same in a vertical direction, substantially as set forth.

6. A churning device comprising a dasher consisting of a split screw-disk having a pair of duplicate oppositely-located hollow blades, disposed reversely to each other and oblique to a horizontal plane, each of said blades comprising upper and lower spaced walls unconnected at their outer edges, means for conducting air to each of said blades, and mechanical means for imparting a positive rotation to the dasher alternately in reverse directions, and simultaneously reciprocating the same in a vertical direction, substantially as set forth.

7. A churning device comprising a dasher consisting of a split screw-disk having a pair of duplicate reversely-arranged blades disposed obliquely to a horizontal plane, each of said blades being open throughout and provided intermediate its ends at its upper and lower sides with transverse interior impact-shoulders, and with air-inlet ports at each side of said interior impact-shoulders, the upper and lower impact-shoulders of the blades being reversely arranged with relation to each other, means for conducting air to said ports, and mechanical means for imparting a positive rotation to the dasher alternately in reverse directions, and simultaneously reciprocating the same in a vertical direction, substantially as set forth.

8. A churning device comprising a dasher consisting of a split screw-disk having a pair of reversely-arranged hollow air-distributing blades, each having intermediate the ends thereof and at its upper and lower sides, transverse deflected portions producing interior impact-shoulders and exterior agitating-shoulders, each of said blades having air-ports at each side of the shoulders thereof, and being open at their outer edges, means for conducting air to the ports of said blades, and mechanical means for imparting a positive rotation to the dasher alternately in reverse directions and simultaneously reciprocating the same in a vertical direction, substantially as set forth.

9. A churning device comprising an air-conducting tube, an air-distributing dasher carried by the tube and having hollow blades in communication therewith, a standard on which the tube and dasher are slidably and revolubly fitted, and a reciprocative operating device engaging with the standard and with the tube for simultaneously rotating said tube and dasher and causing the latter to reciprocate vertically within the churn-receptacle, as set forth.

10. A churning device comprising a single upright supporting-standard, a reciprocative and revoluble dasher loosely mounted on said standard to work freely thereon, and a single operating means slidably supported by the standard and operatively related to the dasher for giving the reciprocative and rotative movements simultaneously thereto, as set forth.

11. A churning device comprising a single supporting-standard having a weighted base which is disconnected from the churn vessel and is adapted to sustain the standard in an upright position, a revoluble and reciprocative dasher mounted on the standard, and a dasher-operating means also mounted on the standard, as set forth.

12. A churning device comprising a single supporting-standard provided at the lower end thereof with a weighted base and at its upper end with a hand-grip, a reciprocative and revoluble dasher mounted for free movement on the standard between the base and the hand-grip thereof, and a dasher-operating means also supported by the standard, as set forth.

13. A churning device comprising a single upright standard provided at its lower end with a weight-base and at its upper end with a removable hand-grip, a bolt for detachably fastening the grip in place, said bolt being provided at one end with an offstanding rest-hook for the hand, and churning mechanism mounted upon the standard, substantially as set forth.

14. A churning device comprising a single upright supporting-standard provided therein with a spiral groove, an air-conducting tube having a lug slidably engaging in said groove, an air-distributing reciprocative and revoluble dasher carried by the air-conducting tube and in communication therewith, and a non-rotating operating-handle mounted to reciprocate upon the standard and having a swiveled connection with the upper end of said tube, substantially as set forth.

15. A churning device comprising an upright supporting-standard, a reciprocatory rotatable air-conducting tube carrying an air-distributing dasher, an operating-handle mounted to reciprocate upon the standard and having an operative connection with the tube, and a splash-guard, said splash-guard consisting of a sleeve detachably suspended at its upper end from the operating-handle to hang over the said air-conducting tube, substantially as set forth.

16. A churning device comprising a single upright supporting-standard, a reciprocatory, revoluble air-conducting tube working over the standard, an air-distributing dasher carried by the tube and in communication therewith, a non-rotating operating-handle mounted to reciprocate upon the standard, and having a flanged lower end loosely engaging within one end of the air-conducting tube, and antifriction-balls arranged above and below the flange at the lower end of said handle, substantially as set forth.

In testimony that we claim the foregoing as our own we have hereto affixed our signatures in the presence of witnesses.

GEO. A. NORCROSS.
ROBERT A. HOLLOWAY.

Witnesses to signature of George A. Norcross:
JOHN H. SIGGERS,
EDWIN E. VROOMAN.

Witnesses to signature of Robert A. Holloway:
ISAAC MANN,
R. H. CUNNINGHAM.